United States Patent
Kawamura

(10) Patent No.: US 8,427,614 B2
(45) Date of Patent: Apr. 23, 2013

(54) REFLECTIVE LIQUID-CRYSTAL DISPLAY APPARATUS AND MANUFACTURING METHOD THEREOF

(75) Inventor: Hideki Kawamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 13/072,049

(22) Filed: Mar. 25, 2011

(65) Prior Publication Data

US 2011/0255043 A1 Oct. 20, 2011

(30) Foreign Application Priority Data

Apr. 15, 2010 (JP) ................................ 2010-094482

(51) Int. Cl.
*G02F 1/1333* (2006.01)
(52) U.S. Cl.
USPC .......................................................... 349/138
(58) Field of Classification Search ........................ None
See application file for complete search history.

(56) References Cited

FOREIGN PATENT DOCUMENTS

JP 2004-198764 7/2004

*Primary Examiner* — Lucy Chien
(74) *Attorney, Agent, or Firm* — Fitzpatrick, Cella, Harper & Scinto

(57) ABSTRACT

A method for manufacturing a reflective liquid-crystal display apparatus is provided. The method includes: forming, over a substrate, a first metal layer and a first insulating layer having an opening and a first through-hole in order; forming a metal portion filled in the opening and a first plug filled in the first through-hole, by forming a metal film over the first insulating layer and planarizing the metal film until the first insulating layer is exposed; forming, over the first insulating layer, a second insulating layer, a second metal layer having an opening, and a third insulating layer in order; forming, in the second and third insulating layer, a second through-hole that passes through the opening of the second metal layer and exposes an upper face of the first plug; and forming a second plug filled in the second through-hole, and a reflective electrode connected to the second plug.

7 Claims, 5 Drawing Sheets

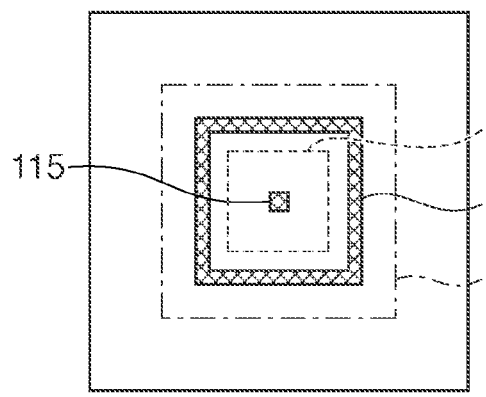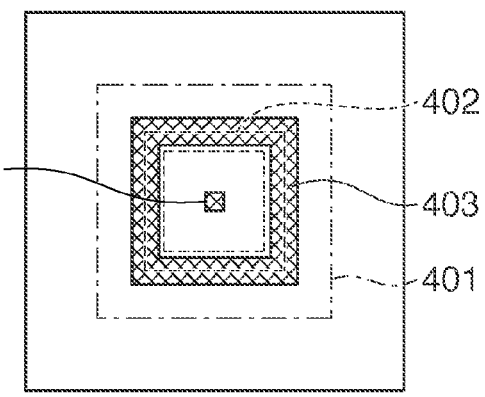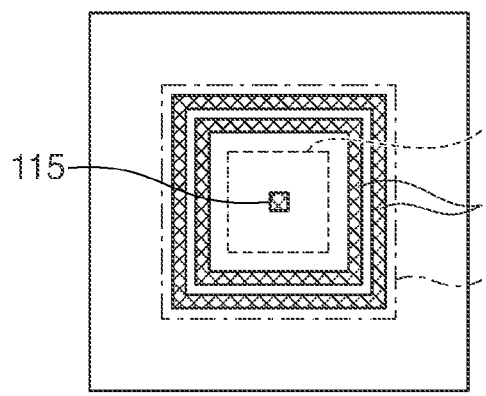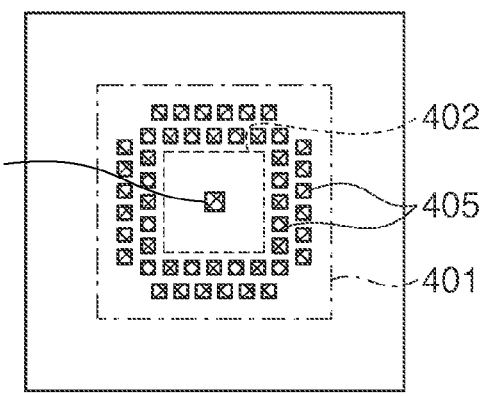

REFLECTIVE LIQUID-CRYSTAL DISPLAY APPARATUS AND MANUFACTURING METHOD THEREOF

BACKGROUND OF THE INVENTION

1. Field of the Invention

The present invention relates to a reflective liquid-crystal display apparatus and a manufacturing method thereof.

2. Description of the Related Art

In a reflective liquid-crystal display apparatus, incident light is transmitted through a transparent substrate, an opposite electrode, and a liquid crystal layer, and is reflected by a reflective electrode. When a voltage is applied between the reflective electrode and the opposite electrode, the alignment state of liquid crystal molecules within the liquid crystal layer changes, and thus the intensity of the reflected light changes. Silicon oxide is typically used in an insulating layer of the reflective liquid-crystal display apparatus. Because silicon oxide has high light transmittance, a portion of the incident light enters from a reflective electrode gap between pixels, and intrudes into a semiconductor substrate below the reflective electrode. As a result, an electron-hole pair is produced by photoelectric conversion in the semiconductor substrate. When this electron or hole reaches an accumulation capacitor for holding the voltage of each reflective electrode, an unintended voltage change of pixel electrodes is invited, thus degrading the quality of a displayed image.

In Japanese Patent Laid-Open No. 2004-198764, a metal film formed on a metal layer is patterned to form a metal protruding portion, and thereon an insulating layer and then a metal layer are formed in order. Thus, incident light that has intruded into the insulating layer can be scattered by the protruding portion, thereby suppressing the intrusion of incident light into the semiconductor substrate. However, in recent liquid crystal display apparatuses, there have been advances regarding increased resolution and brightness, and the size of a single pixel has been reduced. As a result, the reflective electrode gap between pixels and the wavelength of light used for display (400 nm to 800 nm) have become about the same, and a portion of incident light that passes through a narrow slit between reflective electrodes between pixels is diffracted and proceeds in a direction approximately parallel (the lateral direction) to the substrate face. Incident light that has been diffracted in this way unintentionally arrives at the semiconductor substrate without being scattered by the metal protruding portion. Therefore, the insulating layer between the metal protruding portion and the metal layer over the metal protruding portion is desired to be as thin as possible.

In the technology described in Japanese Patent Laid-Open No. 2004-198764, incident light is merely scattered by forming the protruding portion in the metal layer, and there is no investigation of reducing incident light that passes through by adopting a small thickness of insulating layer on the protruding portion. As a result, it is not possible to adequately reduce the amount of incident light arriving at a circuit element. In liquid crystal display apparatuses, technology regarding increased resolution and brightness is advancing. Accordingly, the amount of light that is incident per unit area of such liquid crystal display apparatuses is increasing.

SUMMARY OF THE INVENTION

With the above conventional method, it is difficult to maintain adequate light-shielding properties relative to an increase in incident light density due to reduced pixel size and increased brightness. Consequently, an aspect of the present invention is to provide, in a reflective liquid-crystal display apparatus, technology for reducing the amount of incident light that arrives at a circuit element.

One aspect of the present invention provides a method for manufacturing a reflective liquid-crystal display apparatus, the method comprising: forming, over a substrate where a circuit element is formed, a first metal layer that is electrically connected to the circuit element; forming, over the first metal layer, a first insulating layer patterned so as to have an opening and a first through-hole; forming a metal portion filled in the opening and a first plug filled in the first through-hole, by forming a metal film over the first insulating layer and planarizing the metal film until the first insulating layer is exposed; forming a second insulating layer over the first insulating layer; forming over the second insulating layer a second metal layer patterned so as to have an opening; forming a third insulating layer over the second metal layer; forming, in the second insulating layer and the third insulating layer, a second through-hole that passes through the opening of the second metal layer and exposes an upper face of the first plug; and forming a second plug filled in the second through-hole, and a reflective electrode connected to the second plug.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A to 4D illustrate modified examples of the reflective liquid-crystal display apparatus 100 of the first embodiment.

DESCRIPTION OF THE EMBODIMENTS

First Embodiment

Figure 1:
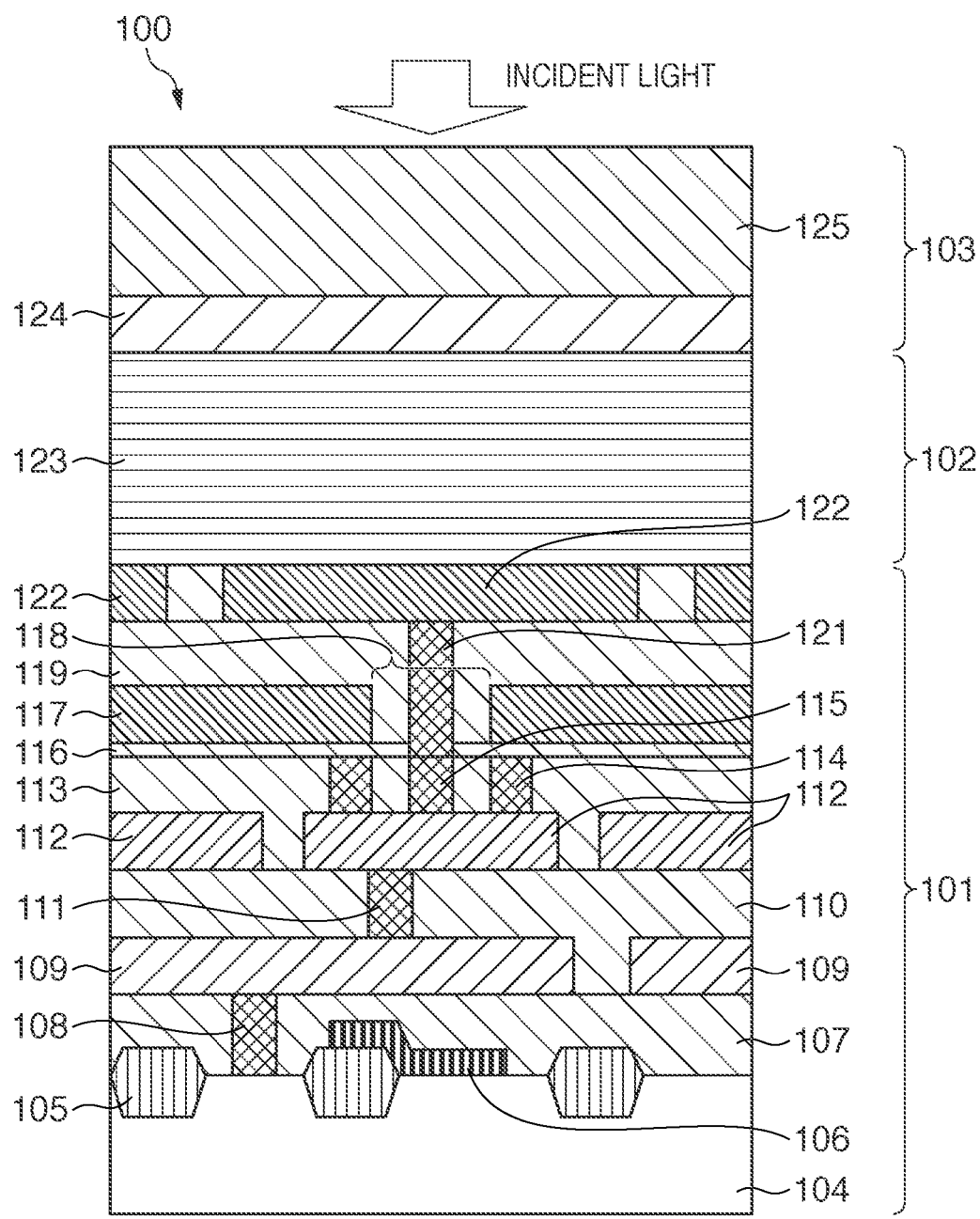
FIG. 1 is a cross-sectional view of an example of the structure of a reflective liquid-crystal display apparatus 100 of a first embodiment.

Embodiment(s) of a reflective liquid-crystal display apparatus and a manufacturing method thereof according to the present invention will now be described with reference to the attached drawings. An example of the structure of a reflective liquid-crystal display apparatus 100 according to the present embodiment will be described with reference to FIG. 1. FIG. 1 is a cross-sectional view that shows the structure of one pixel of the reflective liquid-crystal display apparatus 100. The whole of the reflective liquid-crystal display apparatus 100 is formed by arranging a plurality of the pixels shown in FIG. 1 in an array. The reflective liquid-crystal display apparatus 100 includes a pixel substrate 101, an opposite substrate 103, and a liquid crystal 102 that is located between the pixel substrate 101 and the opposite substrate 103. Incident light from outside of the reflective liquid-crystal display apparatus 100 is transmitted through the opposite substrate 103 and the liquid crystal 102, and then reflected by a reflective electrode 122 within the pixel substrate 101. When a voltage is applied between a transparent electrode 124 within the opposite substrate 103 and the reflective electrode 122 within the pixel substrate 101, an alignment state of liquid crystal molecules in the liquid crystal 102 changes, and thus the intensity of reflected light changes. The reflective electrode 122 is capable of holding an electric potential independently for each pixel, and an image is displayed accordingly.

Next is a detailed description of the structure of the pixel substrate 101, with reference to FIG. 1. Over a silicon substrate 104 where circuit elements such as a MOS transistor and an accumulation capacitor are formed, an insulating layer 107 and a wiring layer 109 are formed in order. In FIG. 1, a silicon oxide film 105 and a polysilicon electrode 106 are shown, but the detailed configuration of circuit elements is not shown. The silicon oxide film 105 functions as an element isolation film, and the polysilicon electrode 106 functions as a gate electrode of the MOS transistor and a capacitive element. The wiring layer 109 and the circuit elements are connected by a plug 108 formed in the insulating layer 107. An insulating layer 110 and a metal layer 112 (a first metal layer) are formed in order over the wiring layer 109, and the metal layer 112 and the wiring layer 109 are connected by a plug 111. An insulating layer 113 (a first insulating layer), an insulating layer 116 (a second insulating layer), and a metal layer 117 (a second metal layer) are formed in order over the metal layer 112. A metal portion 114 and a plug 115 (a first plug) are formed in the insulating layer 113. The height of an upper face of the metal portion 114 can be the same as the height of an upper face of the plug 115. In other words, the upper face of the metal portion 114 and the upper face of the plug 115 can be flush. An insulating layer 119 (a third insulating layer) and the reflective electrode 122 are formed in order over the metal layer 117. A plug 121 (a second plug) is formed in the insulating layer 116 and in the insulating layer 119.

The metal layer 112 and the reflective electrode 122 are electrically connected via the plug 115 and the plug 121. That is, the plug connecting the metal layer 112 and the reflective electrode 122 has a laminated structure. An opening 118 is formed in the metal layer 117, and the plug 121 connects the reflective electrode 122 to the plug 115 through the opening 118. The circuit elements formed in the silicon substrate 104 and the reflective electrode 122 are electrically connected via the wiring layer 109, the metal layer 112, and the plugs 108, 111, 115, and 121. The metal portion 114 and the metal layer 117 are insulated by the insulating layer 116, so the reflective electrodes 122 of adjacent pixels are not electrically connected to each other.

Each of the metal layers 112 and 117 and the metal portion 114 includes a metal having low light transmittance, such as aluminum, tungsten, copper, or titanium, and therefore has light-shielding properties. The metal layers 112 and 117 are formed at a thickness such that adequate light-shielding properties are exhibited, and for example, have a thickness of at least 100 nm. Therefore, a portion of incident light that enters from a gap between the reflective electrodes 122 is blocked by the metal layer 117. Incident light that has intruded from the opening 118 of the metal layer 117 is blocked by the metal layer 112 and the metal portion 114. Thus, incident light is prevented from reaching the circuit elements formed in the silicon substrate 104. The metal layers 112 and 117 may also be laminated with titanium nitride or the like in order to fit more closely with the insulating layers and in order to suppress halation in photolithography.

Figure 2:
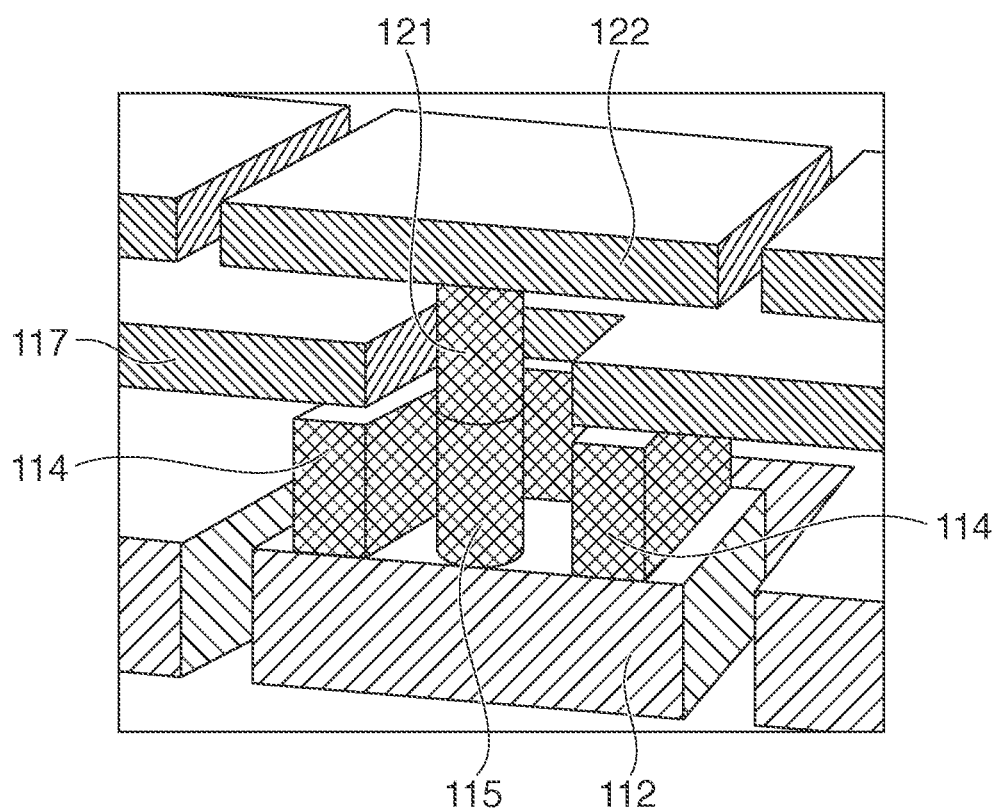
FIG. 2 is a bird's-eye view of part of the cross-section of the reflective liquid-crystal display apparatus 100 of the first embodiment.

FIG. 2 shows a bird's eye view in which a portion of the cross-section of the reflective liquid-crystal display apparatus 100 shown in FIG. 1 is enlarged. In FIG. 2, for the sake of clear viewing, the insulating layers 110, 113, 116, and 119 are omitted. As shown in FIG. 2, the metal portion 114 is formed as a wall-shape member that surrounds the entire circumference of the plug 115.

Figure 3A:
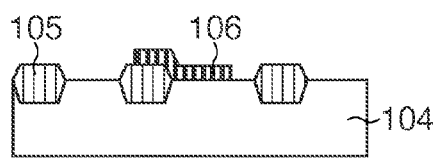
FIGS. 3A to 3H illustrate an example of a method for manufacturing the reflective liquid-crystal display apparatus 100 of the first embodiment.

An example of a method for manufacturing the reflective liquid-crystal display apparatus 100 according to the present embodiment will be described with reference to FIGS. 3A to 3H. As shown in FIG. 3A, ion implantation and thermal diffusion are performed on the p-type silicon substrate 104 to form a well region. Next, by a LOCOS (Local Oxidation of Silicon) method, a region other than the region of the circuit elements in the silicon substrate 104 is thermally oxidized to form the silicon oxide film 105 with a thickness of about 880 nm. The silicon oxide film 105 functions as an element isolation film. After implanting ions for threshold control of the MOS transistor in the silicon substrate 104, a 55 nm oxide film is formed for separating a channel from a gate electrode. Next, the polysilicon electrode 106 that functions as a gate electrode of the MOS transistor and as an electrode of the accumulation capacitor (not shown) is formed with a thickness of 330 nm. Further, ion implantation to the silicon substrate 104 is performed to form a lightly doped drain region, a source region and a drain region.

Figure 3B:
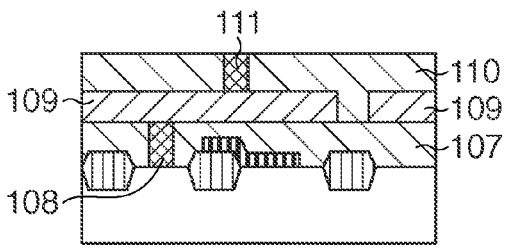

Next, as shown in FIG. 3B, an oxide silicon film is deposited using, for example, a plasma CVD method or the like, and planarized by chemical mechanical polishing (CMP), thus forming the insulating layer 107 with a thickness of 990 nm. A hole is formed in this insulating layer 107, and for example, is filled with tungsten to form the plug 108. Next, the wiring layer 109 is formed on the insulating layer 107 using, for example, a sputtering method. A silicon oxide film is deposited on the wiring layer 109, and planarized by CMP, thus forming the insulating layer 110. A through-hole is formed in the insulating layer 110, and for example, filled with tungsten to form the plug 111.

Figure 3C:
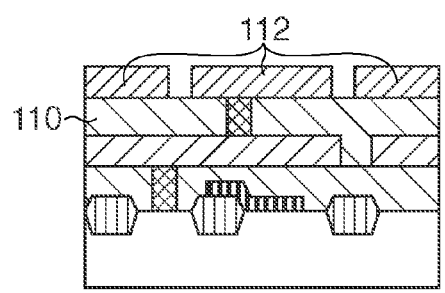
Figure 3D:
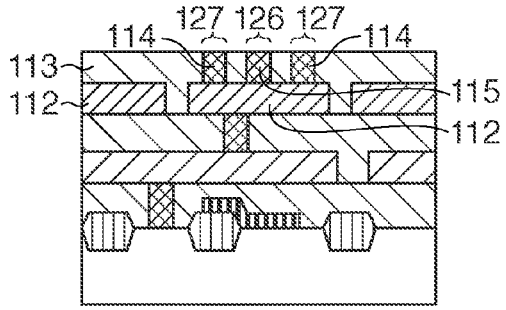

Next, as shown in FIG. 3C, the metal layer 112 that is a laminated film including, for example, titanium oxide, titanium, and aluminum is deposited with a thickness of 800 nm by a sputtering method, and patterned. Next, as shown in FIG. 3D, using, for example, a plasma CVD method or the like, a silicon oxide film is deposited on the metal layer 112, and planarized by CMP for example, thus forming the insulating layer 113. In order to reduce the influence of parasitic capacitance that occurs between the metal layer 112 and the metal layer 117, the thickness of the insulating layer 113 is set to at least 400 nm, for example, and in the present embodiment is set to 1000 nm. Patterning is performed on the insulating layer 113 using a lithography method and etching, thus forming a through-hole 126 (a first through-hole) and an opening 127. A tungsten film that is a metal film is deposited thereon, and the tungsten layer is planarized by CMP until the upper face of the insulating layer 113 is exposed. Thus, the metal portion 114 filled in the opening 127 and the plug 115 filled in the through-hole 126 are formed in the insulating layer 113.

Figure 3E:
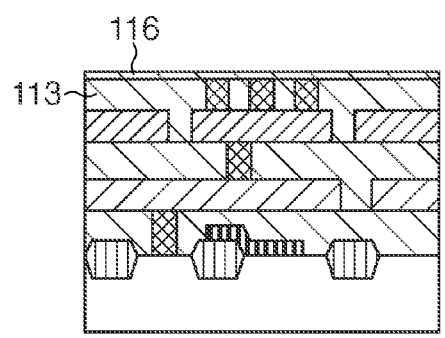

Next, as shown in FIG. 3E, a silicon oxide film is deposited on the insulating layer 113 to form the insulating layer 116. The thickness of the insulating layer 116 is determined from a lower limit value determined by the size of the voltage to be applied between the metal layer 112 and the metal layer 117, and an upper limit value for insuring light-shielding properties, and for example is set to 100 nm. Because the wavelength of light used in the reflective liquid-crystal display apparatus 100 is about 400 nm to 800 nm, if the insulating layer 116 has a thickness of 100 nm, intrusion of incident light can be adequately suppressed. Thus, the insulating layer 116 is formed with a thickness that is less than the thickness of the insulating layer 113.

Figure 3F:
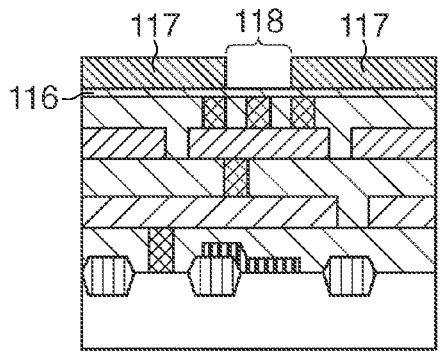
Figure 3G:
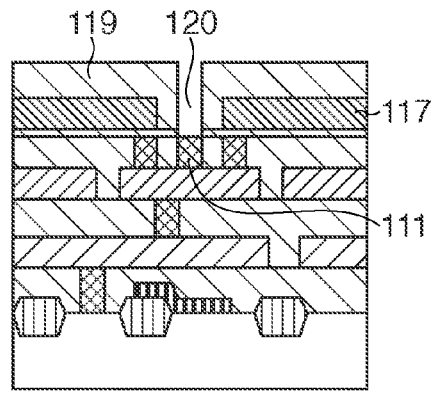

Next, as shown in FIG. 3F, the metal layer 117 including, for example, titanium oxide and titanium is formed, and patterned such that the metal layer 117 has the opening 118. Next, as shown in FIG. 3G, a silicon oxide film is deposited on the metal layer 117, and planarized by CMP, thus forming the insulating layer 119 with a thickness of 350 nm, for example. By performing photolithography and etching on the laminated insulating layer 116 and insulating layer 119, a through-hole 120 (a second through-hole) is formed that exposes the upper face of the plug 111. The through-hole 120 passes through the opening 118 of the metal layer 117.

Figure 3H:
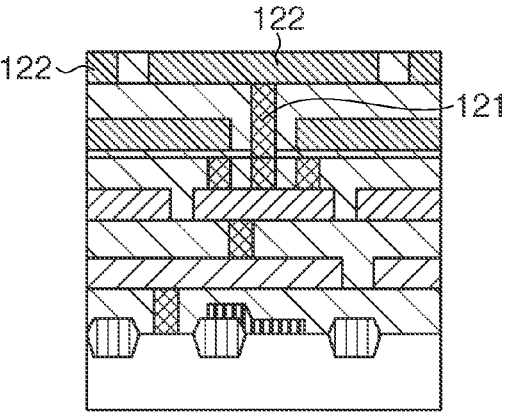

Next, as shown in FIG. 3H, the plug 121 is formed by filling the through-hole 120 with tungsten, for example. Next, the reflective electrode 122 is formed by sputtering, photolithography, and etching. By the above method, the pixel substrate 101 is manufactured. Afterward, the opposite substrate 103 is manufactured by forming the transparent electrode 124 by evaporating ITO (IndiumTinOxide) on the entire face of a transparent substrate 125, and is fixed at a position opposite to the pixel substrate 101 using spacers with a spacing of 6 µm. Lastly, the periphery of the pixel substrate 101 and the opposite substrate 103 is sealed with a sealant, and a liquid crystal 123 is injected between the pixel substrate 101 and the opposite substrate 103. By the above method, the reflective liquid-crystal display apparatus 100 shown in FIG. 1 is manufactured.

With the manufacturing method of the present embodiment, the metal portion 114 and the plug 115 are formed in the same step, so step simplification is possible. Further, the spacing between the metal portion 114 and the metal layer 117 is determined by the thickness of the insulating layer 116. By forming the insulating layer 116 using deposition employing a plasma CVD method or the like, it is possible to form the insulating layer 116 with greater convenience and control than when forming the insulating layer 116 by photolithography, CMP, etching, and so forth. By forming the insulating layer 116 with a small thickness, it is possible to increase the light-shielding effect. As a result, in the reflective liquid-crystal display apparatus 100 according to the present embodiment, image quality degradation when used at high resolution and high brightness is reduced.

The shape and disposition of the metal portion 114 is not limited as long as it is possible to block incident light from the opening 118 of the metal layer 117. Modified examples of the metal portion 114 will be described with reference to FIGS. 4A to 4D. In FIGS. 4A to 4D, a single-dotted broken line 401 indicates the outline of the metal layer 112, and a broken line 402 indicates the outline of the metal layer 117. That is, the inside of the broken line 402 corresponds to the opening 118. Each of FIGS. 4A to 4D shows the disposition of metal portions when the reflective liquid-crystal display apparatus 100 is viewed from above. FIG. 4A shows the disposition of the above-described metal portion 114, which is a wall-shape member surrounding the entire circumference of the plug 115. The metal portion 114 is disposed to the outside of the opening 118. A metal portion 403 shown in FIG. 4B is disposed directly beneath the outer circumference of the opening 118. As in the case of metal portions 404 shown in FIG. 4C, the plug 115 may also be surrounded by a plurality of wall-shape members (two in FIG. 4C). Also, as shown in FIG. 4D, the metal portions 405 may be a plurality of column-shape members that surround the plug 115. In this case, the plug 115 may be surrounded by a plurality of rows of column-shape members, and furthermore the column-shape members may be disposed with an offset pitch for each row.

Second Embodiment

In the first embodiment, the plug the connects the reflective electrode 122 and the metal layer 112 has a laminating structure with the plug 115 and the plug 121. In the present embodiment, a description has been provided of a case when the plug that connects the reflective electrode 122 and the metal layer 112 has a single-layer structure. The structure of the reflective liquid-crystal display apparatus of the present embodiment is the same as the structure of the reflective liquid-crystal display apparatus 100 of the first embodiment, except that the plug 115 and the plug 121 are formed in one step.

Figure 5A:
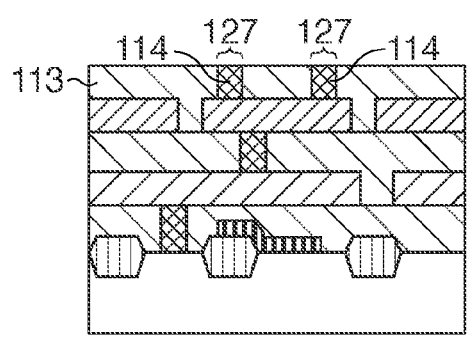
FIGS. 5A to 5D illustrate an example of a method for manufacturing the reflective liquid-crystal display apparatus 100 of a second embodiment.

Next is a description of a method for manufacturing the reflective liquid-crystal display apparatus according to the present embodiment, with reference to FIGS. 5A to 5D. The procedure up until forming the insulating layer 113 is the same as in the first embodiment, and therefore a description thereof is omitted here. As shown in FIG. 5A, patterning is performed on the insulating layer 113 using a lithography method and etching, thus forming the opening 127. Unlike in the first embodiment, a through-hole is not formed at this point in time. A tungsten film is deposited thereon, and the tungsten layer is planarized by CMP until the upper face of the insulating layer 113 is exposed. Thus, the metal portion 114 filled in the opening 127 is formed in the insulating layer 113.

Figure 5B:
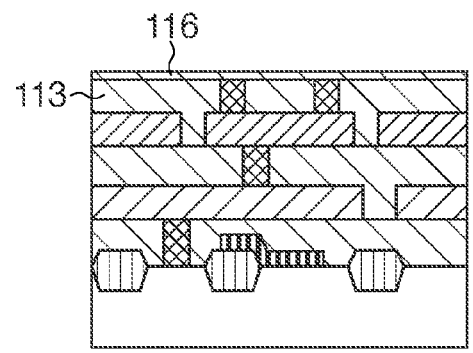
Figure 5C:
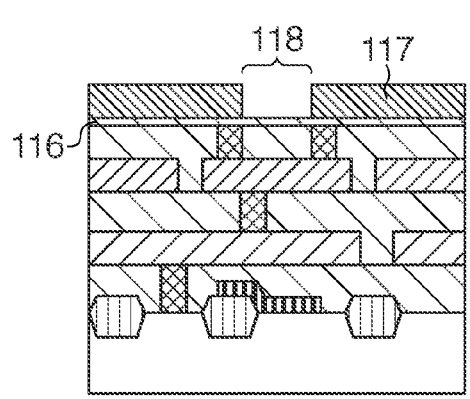
Figure 5D:
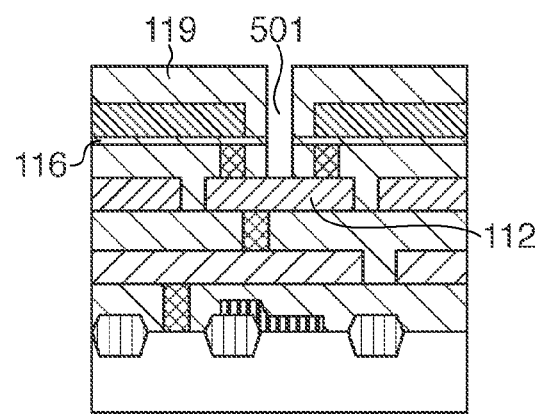

Next, as shown in FIG. 5B, a silicon oxide film is deposited on the insulating layer 113, thus forming the insulating layer 116. The thickness of the insulating layer 116, as in the first embodiment, is set to 100 nm, for example. Next, as shown in FIG. 5C, the metal layer 117 including, for example, titanium oxide and titanium is formed, and patterned such that the metal layer 117 has the opening 118. Next, as shown in FIG. 5D, a silicon oxide film is deposited on the metal layer 117, and planarized by CMP, thus forming the insulating layer 119 with a thickness of 350 nm, for example. By performing photolithography and etching on the laminated insulating layer 113, insulating layer 116 and insulating layer 119, a through-hole 501 is formed that exposes the upper face of the metal layer 112. The through-hole 501 passes through the opening 118 of the metal layer 117. Next, a plug is formed by filling the through-hole 501 with tungsten, for example. The subsequent procedure is the same as in the first embodiment, so a description thereof is omitted here.

With the manufacturing method of the present embodiment, in order to form the through-hole 501 it is sufficient that the upper face of the metal layer 112 is exposed, so alignment is easy. Also, as in the first embodiment, the insulating layer 116 can be formed conveniently and with good control. The modified examples described in the first embodiment are also applicable in the present embodiment.

This application claims the benefit of Japanese Patent Application No. 2010-094482, filed Apr. 15, 2010 which is hereby incorporated by reference herein in its entirety.

What is claimed is:
1. A method for manufacturing a reflective liquid-crystal display apparatus, the method comprising:
  forming, over a substrate where a circuit element is formed, a first metal layer that is electrically connected to the circuit element;
  forming, over the first metal layer, a first insulating layer having a first opening and a first through-hole;

forming a metal portion filled in the first opening and a first plug filled in the first through-hole, by forming a metal film over the first insulating layer and planarizing the metal film until the first insulating layer is exposed;

forming a second insulating layer over the first insulating layer;

forming over the second insulating layer a second metal layer having a second opening;

forming a third insulating layer over the second metal layer;

forming, in the second insulating layer and the third insulating layer, a second through-hole that passes through the second opening and exposes an upper face of the first plug;

forming a second plug filled in the second through-hole; and forming a reflective electrode connected to the second plug.

2. A method for manufacturing a reflective liquid-crystal display apparatus, the method comprising:

forming, over a substrate where a circuit element is formed, a first metal layer that is electrically connected to the circuit element;

forming, over the first metal layer, a first insulating layer having a first opening;

forming a metal portion filled in the first opening, by forming a metal film over the first insulating layer and planarizing the metal film until the first insulating layer is exposed;

forming a second insulating layer over the first insulating layer;

forming over the second insulating layer a second metal layer having a second opening;

forming a third insulating layer over the second metal layer;

forming, in the first insulating layer, the second insulating layer, and the third insulating layer, a through-hole that passes through the second opening and exposes an upper face of the first metal layer;

forming a first plug filled in the through-hole; and forming a reflective electrode connected to the first plug.

3. The method according to claim 1, wherein the thickness of the second insulating layer is less than the thickness of the first insulating layer.

4. The method according to claim 1, wherein the metal portion is a wall-shape member that surrounds the entire circumference of the first plug.

5. The method according to claim 1, wherein the metal portion is a plurality of column-shape members that surround the first plug.

6. A reflective liquid-crystal display apparatus, comprising:

a first metal layer arranged over a substrate where a circuit element is formed, the first metal layer being electrically connected to the circuit element;

a first insulating layer arranged over the first metal layer, a metal portion and a first plug being in openings of the first insulating layer, and contacting the first metal layer;

a second insulating layer arranged over the first insulating layer;

a second metal layer arranged over the second insulating layer, and having an opening;

a third insulating layer arranged over the second metal layer;

a second plug that passes through the opening of the second metal layer, and is filled in openings of the second insulating layer and the third insulating layer so as to connect to the first plug; and a reflective electrode connected to the second plug, wherein the height of an upper face of the metal portion is the same as the height of an upper face of the first plug.

7. The apparatus according to claim 6, wherein the metal portion and the first plug contact the first metal layer.

* * * * *